(12) United States Patent
Hammack (10) Patent No.: US 9,063,210 B2
(45) Date of Patent: Jun. 23, 2015

(54) METHOD FOR DE-INTERLEAVING RECEIVED RADAR PULSES USING DYNAMICALLY UPDATED WEIGHTS

(75) Inventor: George D. Hammack, Santa Barbara, CA (US)

(73) Assignee: RAYTHEON COMPANY, Waltham, MA (US)

( * ) Notice: Subject to any disclaimer, the term of this patent is extended or adjusted under 35 U.S.C. 154(b) by 356 days.

(21) Appl. No.: 13/487,044

(22) Filed: Jun. 1, 2012

(65) Prior Publication Data

US 2014/0009325 A1    Jan. 9, 2014

(51) Int. Cl.
*G01S 7/02* (2006.01)
*G01S 7/292* (2006.01)
*G01S 13/87* (2006.01)

(52) U.S. Cl.
CPC .............. *G01S 7/021* (2013.01); *G01S 7/2923* (2013.01); *G01S 13/87* (2013.01)

(58) Field of Classification Search
CPC ........ G01S 7/021; G01S 13/87; G01S 7/2923
USPC .......................................................... 342/195
See application file for complete search history.

(56) References Cited

U.S. PATENT DOCUMENTS

| 6,985,102 B1 | 1/2006 | Horn et al. |
| 7,397,415 B1 | 7/2008 | Wang et al. |
| 7,830,297 B1 * | 11/2010 | Wang et al. .................. 342/13 |
| 2005/0033789 A1 | 2/2005 | Sirois |

FOREIGN PATENT DOCUMENTS

EP    0 367 273 A2    5/1990

OTHER PUBLICATIONS

Written Opinion of the International Searching Authority for International Application No. PCT/US2013/033387, filed Mar. 21, 2013, Written Opinion of the International Searching Authority mailed Dec. 3, 2013 (6 pgs.).
International Search Report for International Application No. PCT/US2013/033387, filed Mar. 21, 2013, International Search Report dated Nov. 27, 2013 and mailed Dec. 3, 2013 (4 pgs.).

(Continued)

*Primary Examiner* — Timothy A Brainard
(74) *Attorney, Agent, or Firm* — Christie, Parker & Hale, LLP (57) ABSTRACT

The present invention provides a method for separating, or de-interleaving, a stream of radar pulses, interleaved in time, received by a receiving antenna (10) and receiver (12) from several radar sources. De-interleaving the stream of received pulses may include forming clusters of pulses having similar parameter values around anchor points, where each cluster is defined by a window around its anchor point. The dimensions of each window may be determined by a weighted distance, i.e., a measure of dissimilarity, calculated using weights. Each weight may depend inversely on the measurement error in the parameter with which the weight is associated. Each anchor point may have a set of weights adjusted to its parameter values, and which may change as operating conditions change. The weights may be determined using a method including a calibration step, which may include injecting pulses with known parameters into the receiver (12).

12 Claims, 4 Drawing Sheets

(56) References Cited

OTHER PUBLICATIONS

Granger, et al., "A What-and-Where Fusion Neural Network for Recognition and Tracking of Multiple Radar Emitters", Neural Networks, Elsevier Science Publishers, Barking, GB, vol. 14, No. 3, Apr. 1, 2001 (pp. 325-344).

Granger, et al., "A Comparison of Self-Organizing Neural Networks for Fast Clustering of Radar Pulses", Signal Processing, Elsevier Science Publishers B.V. Amsterdam, NL, vol. 64, No. 3, Feb. 26, 1998, (pp. 249-269).

Ata'a, et al., "Deinterleaving of Radar Signals and PRF Identification Algorithms", IET Radar Sonar Navig., vol. 1, No. 5, Oct. 18, 2007 (pp. 340-347).

* cited by examiner

METHOD FOR DE-INTERLEAVING RECEIVED RADAR PULSES USING DYNAMICALLY UPDATED WEIGHTS

BACKGROUND

1. Field

One or more aspects of embodiments according to the present invention relate to analyzing received radar pulses and in particular to de-interleaving interleaved radar pulses received from multiple sources.

2. Description of Related Art

When a military asset such as an aircraft is simultaneously illuminated by multiple radar systems, it may be useful to sort the received radar pulses into groups, or clusters, according to their source. An asset may, for example, be illuminated by several different radars from different directions, each having a different combination of amplitude, carrier frequency, pulse width, and modulation type. The received radar pulses may be detected and analyzed by a radar analysis system such as a radar warning receiver (RWR), which may then identify each source as being, for example, ship-board radar, aircraft radar, or missile radar.

Radar pulses from multiple sources may be interleaved in time when they arrive at the radar analysis system. As a first step in analyzing the received pulses it may be desirable to de-interleave them, i.e., to form multiple individual pulse trains, each corresponding to one of the radar sources. This may be particularly important for determining certain characteristics of each source: in a stream of pulses from several sources, for example, each operating at a different pulse repetition rate (PRR), it is difficult to infer the PRR of any one source without first separating, i.e., de-interleaving, the stream into separate pulse trains, one pulse train for each source. Once the stream is de-interleaved the PRR of each source is, in the ideal case, simply the rate at which pulses occur in the corresponding pulse train. Even if some pulses are lost in processing, the PRR of a given source may be estimated from the remaining pulses, for example by inserting pulses as needed to produce a regular sequence of pulses. Other attributes such as the carrier frequency may be determined from a single pulse, but it may be possible to determine it more accurately from a series of pulses originating from the same source.

Prior art systems may perform de-interleaving by grouping received pulses into "clusters" of similar pulses. Pulses that are, according to some measure of similarity, sufficiently similar, are deemed to have originated from a single source, and pulses that are dissimilar are deemed to have originated from different sources. Various attributes, or parameters, may be compared when assessing the degree of dissimilarity, or "distance," between pulses, including frequency, the direction from which the pulses arrived or angle of arrival (AOA), pulse width, and amplitude. A weighted measure of distance may be used. In such a measure a weight may be defined for each parameter and differences in any parameter multiplied by the corresponding weight.

Selecting the weights for a weighted distance generally involves making a compromise between the respective likelihoods of two types of error. If a weight is made too large, pulses originating from the same source may be incorrectly classified as originating from different sources; if the weight is made too small, pulses originating from different sources may incorrectly be classified as originating from the same source. If the measurement error in a parameter is large, it may be preferable to use a small weight, so that variations in the measured value due to measurement error do not cause pulses, which in fact are quite similar, to be classified as originating from different sources. Thus the optimum weights may vary, depending on operating conditions. At high temperature, for example, amplifier noise in the receiver may cause the measurement error for some parameters to increase, with the result that smaller weights may be preferred at higher temperatures.

In prior art de-interleavers, the weights may be fixed prior to operation, and they may be independent of the pulse parameters. Weights chosen for low temperature operation may then be too large at high temperatures, and, conversely, weights chosen for high temperatures may be too small for good performance at low temperatures. Similarly the optimum weights may also depend on the parameter values. The measurement error in pulse width may be greater, for example, for short pulses than for long pulses, so that weights chosen for small pulse width may be too small when used for long pulses, and weights chosen for long pulses may be too large when used for short pulses. Thus there is a need for a de-interleaving system capable of performing well over a range of operating conditions and pulse parameters.

SUMMARY

Embodiments of the present invention provide a method for separating, or de-interleaving, a stream of radar pulses received by a radar analysis system from several radar sources, and interleaved in time. De-interleaving the stream of received pulses may include forming clusters of pulses having similar parameter values around anchor points, where each cluster is defined by a window around its anchor point. The dimensions of each window may be determined by a weighted distance, i.e., a measure of dissimilarity calculated using weights. Each weight may depend inversely on the measurement error in the parameter with which the weight is associated. Each anchor point may have a set of weights adjusted to its parameter values, and which may change as operating conditions change. The weights may be determined using a method including a calibration step, which may include injecting pulses with known parameters into the receiver, to determine the variation in the measured values of the corresponding pulse parameters.

According to an embodiment of the present invention there is provided a method of determining whether a received pulse, in a stream of pulses received by a radar receiver, is a member of a cluster, the cluster having an anchor point, the received pulse and the anchor point each having a respective feature vector, each feature vector having a multiplicity of features, the method comprising: generating at least one weight corresponding to a feature, calculating, using the weight, a weighted distance between the feature vector of the received pulse and the feature vector of the anchor point, comparing the weighted distance to a threshold, and determining that the received pulse is a member of the cluster if the weighted distance is less than the threshold, wherein the generating at least one weight corresponding to a feature comprises: injecting pulses of known characteristics into the radar receiver during operation, determining the variation in the feature measured, and calculating the weight as a function of the variation in the feature measured.

In one embodiment, the feature is selected from the group consisting of: pulse width, pulse carrier frequency, elevation angle of arrival, azimuth angle of arrival, and pulse amplitude.

In one embodiment, the generating at least one weight corresponding to a feature is repeated after the elapse of a predetermined length of time.

In one embodiment, the generating at least one weight corresponding to a feature is repeated after a change in an environmental condition exceeding a predetermined amount.

In one embodiment, the weighted distance is the weighted $l_2$ distance.

In one embodiment, weighted distance is the weighted $l_2$ distance wherein the matrix of weights is the inverse covariance matrix.

According to an embodiment of the present invention there is provided a method of determining whether a received pulse, in a stream of pulses received by a radar receiver, is a member of a cluster, the cluster having an anchor point, the received pulse and the anchor point each having a respective feature vector, each feature vector having a multiplicity of features, the method comprising: generating at least two weights corresponding to a feature, calculating, using the weights, a weighted distance between the feature vector of the received pulse and the feature vector of the anchor point, comparing the weighted distance to a threshold, and determining that the received pulse is a member of the cluster if the weighted distance is less than the threshold, wherein the calculating the weighted distance comprises selecting a weight from the at least two weights based on the corresponding feature in the feature vector of the anchor point.

In one embodiment, the at least two features are selected from the group consisting of: pulse width, pulse carrier frequency, elevation angle of arrival, azimuth angle of arrival, and pulse amplitude.

In one embodiment, the generating at least two weights corresponding to a feature is repeated after the elapse of a predetermined length of time.

In one embodiment, the generating at least two weights corresponding to a feature is repeated after a change in an environmental condition exceeding a predetermined amount.

In one embodiment, the weighted distance is a weighted $l_2$ distance.

In one embodiment, the weighted $l_2$ distance is the Mahalanobis distance.

According to an embodiment of the present invention there is provided a system for de-interleaving pulses in a series of received pulses, comprising: a receiver for generating a pulse parameter vector for each received pulse, a pulse generator for generating a set of calibration pulses, and a de-interleaver configured to classify, using a set of weights, each received pulse into one of a multiplicity of de-interleaved pulse trains, wherein the de-interleaver comprises a weighting controller for generating the set of weights, the weighting controller being configured to determine the set of weights during operation from pulse parameter vectors corresponding to the set of calibration pulses.

In one embodiment, the weighting controller is further configured to receive data on the operating environment of the system, and to adjust the weights based on the received data.

In one embodiment, each weight in the set of weights corresponds to an element of the pulse parameter vectors.

In one embodiment, the pulse parameter vectors comprise a parameter selected from the group consisting of: pulse width, pulse carrier frequency, elevation angle of arrival, azimuth angle of arrival, and pulse amplitude.

In one embodiment, the de-interleaver is further configured to trigger the weighting controller to determine the set of weights upon the elapse of a predetermined length of time after the previous trigger.

In one embodiment, the de-interleaver is further configured to trigger the weighting controller to determine the set of weights upon a predetermined change in environmental conditions.

In one embodiment, the de-interleaver is configured to classify, using a set of weights in a weighted $l_2$ distance, each received pulse into one of a multiplicity of de-interleaved pulse trains.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of the presently preferred embodiments of a method for de-interleaving received radar pulses, using dynamically updated weights, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Figure 1:
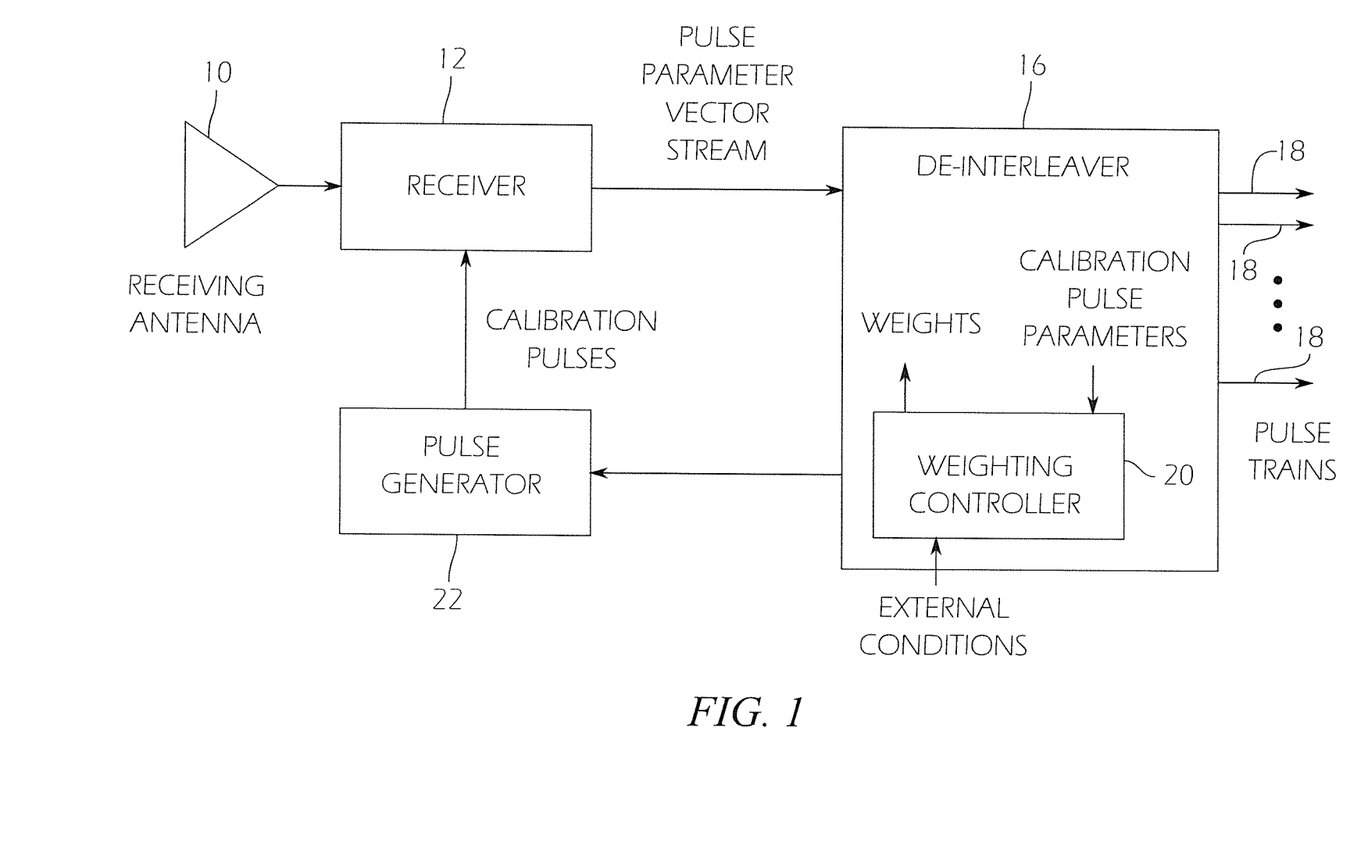
FIG. 1 is a block diagram of a system including a de-interleaver according to an embodiment of the present invention.

Referring to FIG. 1, in an embodiment of the present invention, a receiving antenna 10 connected to a receiver 12 receives incoming radar pulses. The receiver 12 then characterizes each received pulse in terms of various parameters, including for example amplitude, time of arrival, pulse width, angle of arrival in azimuth and elevation, intentional modulation on the pulse, and carrier frequency, and delivers a stream of pulse parameter vectors to a de-interleaver 16. The de-interleaver classifies the pulses into clusters and outputs the contents of each cluster as a separate pulse train 18. During the classification process, each received pulse may be classified as part of a cluster, or not, depending on whether it is sufficiently close to the center of the cluster. This determination may be made by a measure of distance using weights. The weights may depend on the parameter values, and on external environmental conditions such as temperature, and they may periodically be revised, either after the elapse of a predetermined time interval or when an external environmental condition changes by a predetermined amount. A process known as calibration, or built-in test, may be used to generate revised weights. In such a process, pulses with well known parameters may, under the control of the de-interleaver 16, be injected by a pulse generator 22 into the receiver 12, and the resulting calibration pulse parameter vectors may be fed into a weighting controller 20, which then may establish revised weights based on the variation in the measured parameters for series of nominally identical calibration pulses. In one embodiment, the de-interleaver may be a processing unit.

The pulse parameters measured by the receiver may differ at least slightly from the true parameters of the emitted radar pulses, for a number of reasons, including atmospheric effects, the Doppler effect, and noise and distortion in the receiver. For example, the nominal pulse width of pulses emitted by a particular radar may be 1 microsecond (μs), and the receiver may measure the pulse width of a particular pulse as being 0.8 μs or 0.9 μs. Even identical pulses emitted from a single radar source may therefore result in different pulse parameter vectors. Part of the task of the de-interleaver, therefore, is to determine whether pulses that differ somewhat nonetheless originated from the same radar source.

Not all parameters may be useful for the purpose of classifying the pulses into clusters. A parameter may vary so little between different transmitting radar systems that its variation cannot be measured in a meaningful way, and its use may therefore not facilitate the classification of the received pulses. The de-interleaver may therefore select a subset of the received parameters to be used in classifying the received pulses into clusters. The parameters in this subset are known as "features," and they form a feature vector for each pulse to be classified. Each n-dimensional feature vector corresponds to a point in the n-dimensional feature space, and the terms "point," "feature vector," and "pulse" are used interchangeably herein to denote a given pulse's features.

Pulses may be classified into clusters using an algorithm relying on "anchor points." The first pulse received, and any subsequently received pulse which is not sufficiently similar to previously received pulses, becomes an "anchor point" which defines a new cluster centered on that anchor point. Whether a subsequently received pulse belongs in an established cluster may be determined by the degree of dissimilarity, or distance, between the subsequently received pulse and the anchor point for the cluster. If the distance between the pulse and the anchor point is less than a predetermined threshold distance, then the pulse is classified as belonging to the cluster, if the distance exceeds the threshold then the pulse becomes a new anchor point. Equivalently, any pulse falling within a "window" around the anchor point is classified as belonging to the cluster. This window is the region of feature space within which all points are nearer the anchor point than the threshold distance. For the classification technique to be unambiguous, the windows must not overlap. If a pulse falls outside a cluster window but sufficiently close to the window that making the pulse into an anchor point would result in overlapping windows, then it may be necessary to discard the point, or reduce the size of one or both windows to avoid overlap.

The distance d between a pulse to be classified and an anchor point may be calculated, for example, as the Euclidean distance, given by $$d(x, y) = \sqrt{\sum_{i=1}^{N} (x_i - y_i)^2}$$

where x is the anchor point feature vector and y is the feature vector of the pulse to be classified, and $x_i$ and $y_i$ are the $i^{th}$ features (i.e., the $i^{th}$ elements of the feature vectors) of the anchor point and of the pulse to be classified, respectively.

It may be preferable to use a weighted distance. As used herein, a "weighted distance" is any measure of dissimilarity using weights. An example of a weighted distance is the normalized Euclidean distance, given by $$d(x, y) = \sqrt{\sum_{i=1}^{N} \frac{(x_i - y_i)^2}{\sigma_i^2}}$$

where $\sigma_i^2$ is the variance of the $i^{th}$ feature. Another example is the more general weighted $l_2$ distance, given by $$d(x, y) = \sqrt{(x-y)^T B(x-y)}$$

where B is a matrix of weights, and x is again the anchor point feature vector and y the feature vector of the pulse to be classified. If the matrix of weights B is the inverse covariance matrix, then this distance is the Mahalanobis distance. Each anchor point may have a set of weights associated with it, to be used for calculating the distance between the anchor point and any pulse.

Figure 2A:
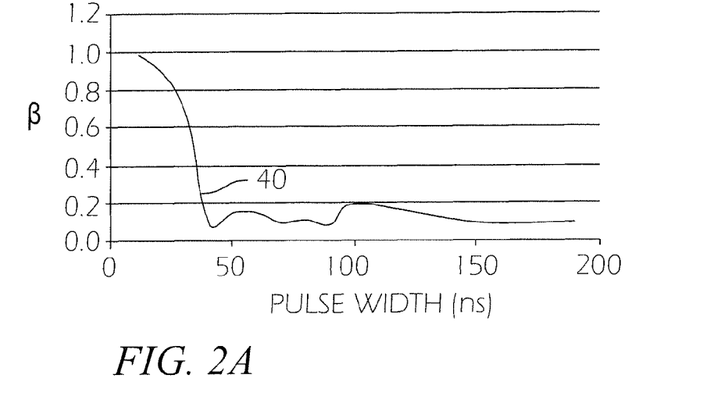
FIG. 2A is an exemplary plot of pulse width measurement variance used to generate weights according to an embodiment of the present invention.
Figure 2B:
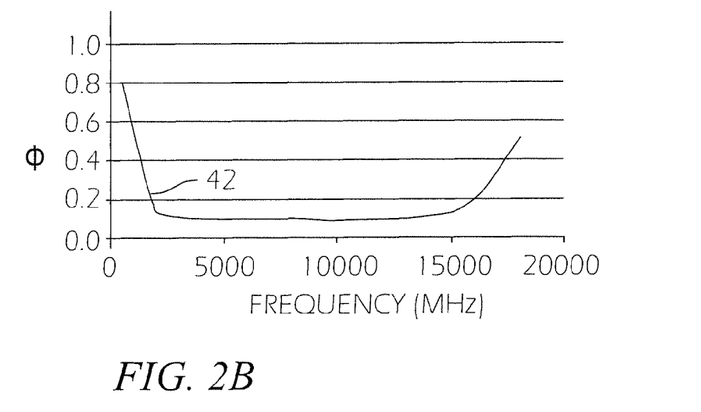
FIG. 2B is an exemplary plot of carrier frequency measurement variance used to generate weights according to an embodiment of the present invention.
Figure 2C:
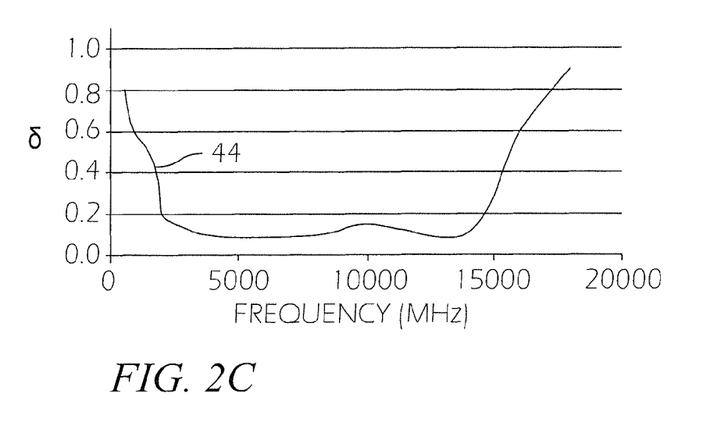
FIG. 2C is an exemplary plot of angle of arrival measurement variance used to generate weights according to an embodiment of the present invention.

Referring to FIGS. 2A-2C, the measurement error for a feature may depend on the value of the feature itself For example, as illustrated in FIG. 2A, which illustrates the fractional error β in the measurement of the pulse width as a function of the pulse width, the fractional error may be significantly larger for pulses shorter than 40 nanoseconds (ns) than for longer pulses. The curve 40 representing the functional relationship between the fractional pulse width measurement error and pulse width may be used to generate a weight for any given anchor point pulse width. The weight may for example be chosen to be inversely proportional to the measurement error. Similarly, FIG. 2B and FIG. 2C show exemplary variations of fractional frequency measurement error φ and fractional angle of arrival error δ as a function of frequency, respectively. Here, angle of arrival may refer, for example, to the azimuth component of the angle of arrival or to the elevation component. The curves 40, 42, and 44 in FIGS. 2A-2C do not represent experimental data, they are hypothetical curves shown for the purpose of illustrating the principles of operation of the present invention. The measurement error may depend also on environmental parameters such as the temperature of the receiver because, for example, noise or distortion in amplifiers in the receiver may depend on temperature.

It may be preferable to use a large weight for a feature which the receiver is able to measure with high accuracy, as even small variations in the measured value of such a feature may indicate that the corresponding pulses originated from different radar sources. Conversely it may be preferable to use a small weight for a feature the measured value of which, as a result of receiver measurement error, varies greatly even for identical received pulses, because in this case even significant differences in this feature may not indicate that the pulses originated from different radar sources. Weights inversely proportional to the variances in the measured features for identical pulses, or related in some other way to the inverse variance or covariance, may therefore be used.

If a weighted distance, such as the weighted $l_2$ distance, is used, then the weights may be selected in a manner depending on external conditions such as temperature, or on the features of the anchor point, i.e., the location of the anchor point in feature space. Allowing the weights to depend on the features of the anchor point, and on the external environment, may result in a significant performance improvement over prior art embodiments in which a single "set and forget" vector of weights, selected prior to operation and unchanged for all anchor points is used. In a system with the fractional frequency measurement error illustrated in FIG. 2B, for example, a small weight may be appropriate for low and high frequencies, and a larger weight for intermediate frequencies. In a prior art embodiment with a single fixed weight, the weight may be too small at intermediate frequencies, or too large at low and high frequencies, or both. Moreover, by remaining fixed during operation, the weight in such a prior art embodiment may be too large or too small at high or low temperatures, for example, even if it is optimum for some particular temperature and frequency.

The weights may be determined by various methods. Empirical data on the variation in measured parameters may be obtained from range tests, in which the receiver is illuminated by several known radar sources simultaneously. Numerical models of the mechanisms causing measurement errors may also be used to estimate the expected variation in measured parameters for identical pulses. During operation, a calibration process may be used to generate revised weights. In this process, calibration pulses having well known pulse parameters may be injected into the receiver. They may then be processed by the receiver in the same manner as pulses received from the receiving antenna, and a pulse parameter vector corresponding to each calibration pulse may be sent to the de-interleaver by the receiver. The de-interleaver may then send the pulse parameter vectors on to the weighting controller, which may generate revised weights based on the true characteristics of the calibration pulses and on the received pulse parameter vectors. If the dependence is known, information about external environmental conditions may also be incorporated into the calculation of the weights. For example, if an increase in temperature results in a known increase in the pulse width measurement error, then the pulse width weight may be reduced accordingly when the temperature increases. A similar result may be realized if a new calibration is performed when the temperature changes. An increase in temperature may trigger a new calibration, which will reveal that the pulse width measurement error is higher, and, in this case too, the corresponding weight will be reduced accordingly.

Figure 3:
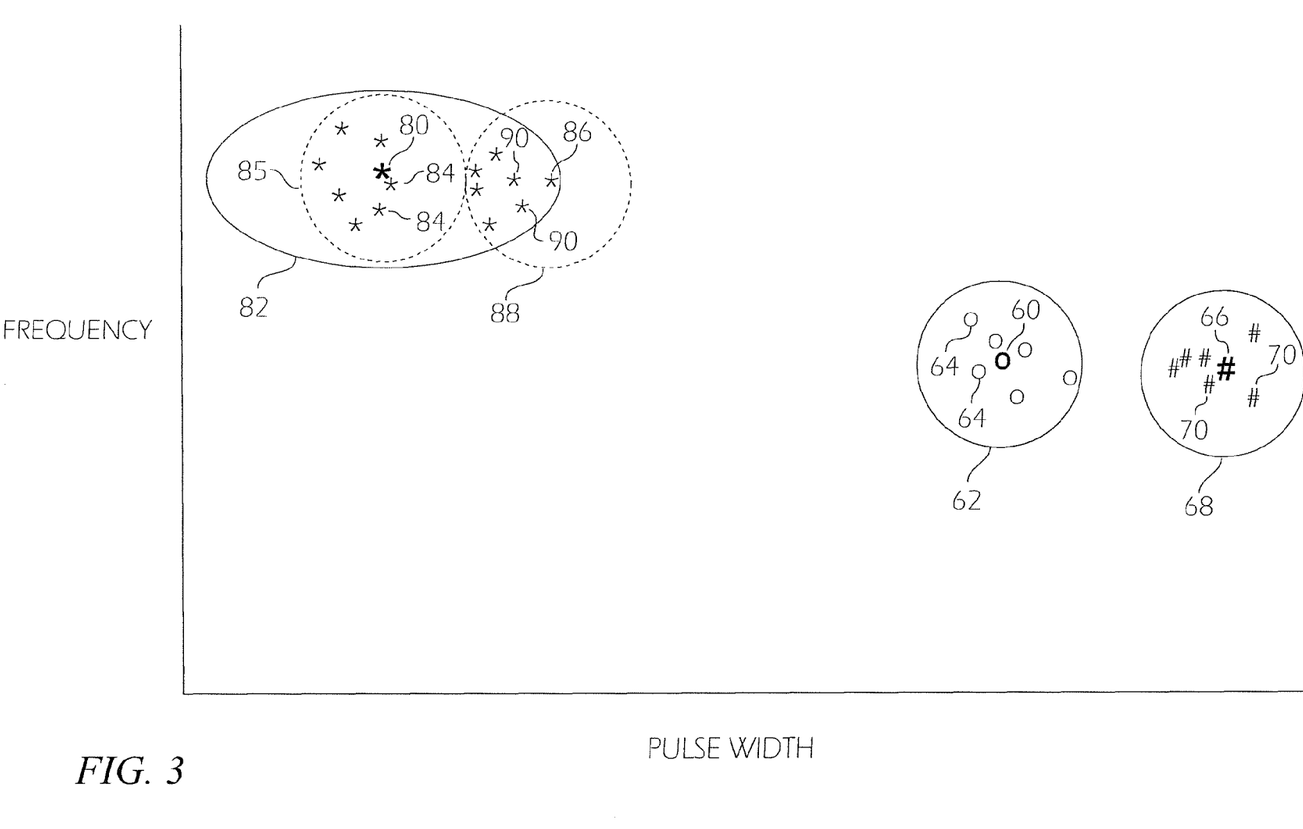
FIG. 3 is a plot of cluster windows and clusters in a two-dimensional feature space according to an embodiment of the present invention.

Referring to FIG. 3, cluster windows may be illustrated as ellipses or circles in a two-feature example. In the scatter plot shown, each symbol, viz. asterisk ("*"), "O" symbol, or pound symbol ("#"), represents the feature vector, or point in the feature space, corresponding to a received pulse. Each feature vector in this example contains two features, the pulse width and the frequency. The pound anchor point 66, i.e., the anchor point for the cluster of pulses identified by pound symbols, is the center of the window for that cluster, which contains all pulses falling within the window 68, a circle around the pound anchor point 66. The circular shape of this window may result, for example, from using an $l_2$ distance with $B_{11}=B_{22}$ and $B_{12}=B_{21}=0$, where the subscript 1 may refer to the first feature, i.e., pulse width, and the subscript 2 may refer to the second feature, i.e., frequency. Similarly the circular window 62 for the "O" cluster is centered on the anchor point 60 labeled "O" so that other points 64 falling within this window 62 are classified as being part of this cluster and as originating from the same source as the anchor point 60.

If the measurement error and resulting scatter are larger at lower pulse width, then in this example using the same window size may result in incorrect classification of some points. For example, if the anchor point 80 is first established as an anchor point with the relatively small window 85, then some points, such as the points 84 which fall close to it, may be classified as being part of the cluster, but another point, such as the point 86, which may originate from the same source, may fall sufficiently far from the anchor point 80 to be classified as a new anchor point, with its own window 88. Subsequently received points such as the points 90 which fall within the window 88 will then be included in the cluster defined by the anchor point 86, and the algorithm may deem the pulses 90 as well as the anchor point 86 to have originated from a radar source separate and distinct from that which produced the anchor point 80 and the points 84 in its cluster. This may be incorrect; all the points may correspond to the same source but may have been distributed more widely in the two-dimensional feature space because of larger measurement error at low pulse widths.

If, on the other hand, the window is made larger, i.e., the weights made smaller, to correspond to the larger measurement error at low pulse widths, and a window such as the window 82 is used instead, then the point 86, and, indeed, all of the other points shown as asterisks, may fall inside the window and be classified as part of the same cluster.

A calibration process which determines the measurement error in each feature at various points in feature space may be used to generate weights which take this variation into account. For example, the pulse generator may generate a series of nominally identical calibration pulses with low pulse widths, and the weighting controller may use the observed variance in the corresponding pulse parameter vectors received from the receiver to set the weights for low pulse width anchor points. The pulse generator may also generate a series of nominally identical calibration pulses at higher pulse widths. Again, the weighting controller may use the observed variance in the corresponding pulse parameter vectors received from the receiver to set the weights for higher pulse width anchor points. The observed variance may be smaller for the higher pulse width calibration pulses than for the lower pulse width pulses, and the weighting controller may accordingly set larger weights for higher pulse width pulses, resulting in better performance than if a single constant weight were used. Series of nominally identical calibration pulses may similarly be used at other points in feature space to set the corresponding weights.

The calibration process may be effective primarily for determining the variance due to receiver measurement errors, the variance due to atmospheric effects may, for example, not be measured by this process. Measurement errors introduced by effects outside of the receiver may nonetheless be estimated using models, based for example on weather conditions, relative velocities, accelerations, and the like, and these measurement errors may be taken into account by the weighting controller when generating weights.

Figure 4:
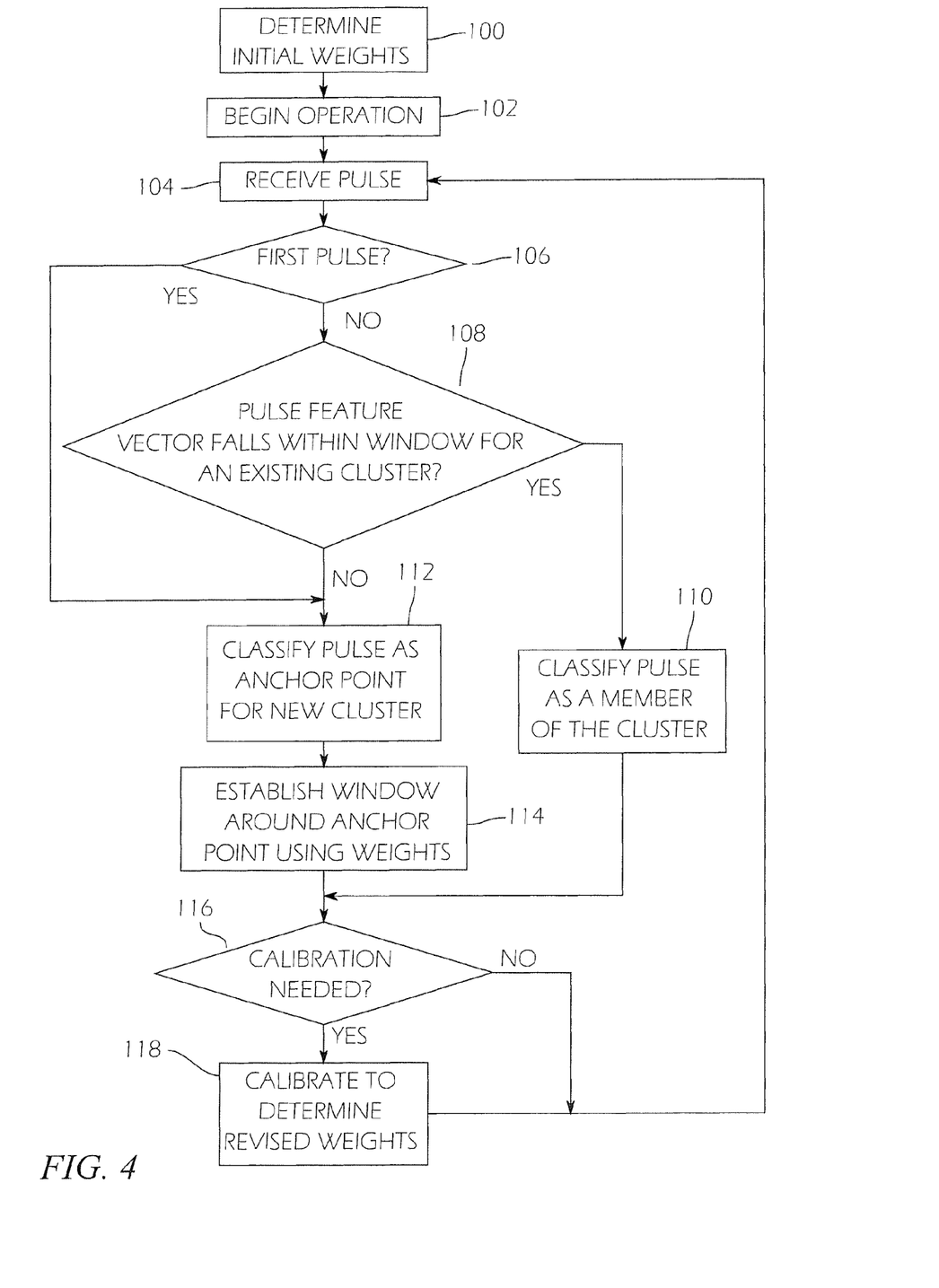
FIG. 4 is a flow chart illustrating a method of de-interleaving according to an embodiment of the present invention.

Referring to FIG. 4, the sequence of steps involved in de-interleaving a stream of pulses by classifying them into clusters may be illustrated using a flow chart. In step 100, initial weights may be determined empirically at a range, using known radar sources for calibration, or using numerical models, or by a combination of such methods. Operation begins in step 102 and a pulse is received in step 104. In step 106, if the received pulse is the first pulse, the step 108 of comparing it to existing cluster windows is skipped, there not being any such windows, and the pulse is classified, in step 112, as the anchor point of a new cluster.

If in step 106 it is determined that the current pulse is not the first pulse, then the current pulse is compared, in step 108, to all existing cluster windows. Step 108 involves calculating the weighted distance between the pulse feature vector and the feature vector of the anchor point of each existing cluster, using, in each case, the vector of weights for that anchor point. If it falls within any such window it is classified, in step 110, as a member of the corresponding cluster, if it does not, it is classified in step 112 as the anchor point for a new cluster. When a new cluster is established in step 112, a window is established around it, in step 114. In step 116, several conditions may be assessed to determine whether a calibration is needed. These conditions may include the passage of a certain amount of time since the last calibration, or a change in the environment, such as a change in temperature, or for example, in the case of a system deployed on an aircraft, a change in altitude. If a calibration is needed, then it is performed, in step 118, and the resulting revised weights are used in subsequent executions of step 108, until the weights are again revised. Finally operation resumes with the reception of the next pulse, in step 104.

Although in the embodiment for which a sequence of steps is illustrated in FIG. 4 de-interleaving ceases while a calibration is performed, the present invention is not limited to such a sequence. Calibration and de-interleaving may be performed simultaneously, with the de-interleaver continuing, during a calibration, to de-interleave pulses that are not calibration pulses, and routing to the weighting controller only the pulse parameter vectors corresponding to calibration pulses.

Although limited embodiments of a method for de-interleaving received radar pulses using dynamically updated weights have been specifically described and illustrated herein, many modifications and variations will be apparent to those skilled in the art. For example, although the de-interleaving method of the present invention is disclosed in the context of a military RWR, it may be equally well be employed in a different military radar sensing system such as an electronic intelligence (ELINT) system, or in a civilian system, such as a system for tracking civilian aircraft. Accordingly, it is to be understood that the method for de-interleaving received radar pulses using dynamically updated weights employed according to principles of this invention may be embodied other than as specifically described herein. The invention is also defined in the following claims.

What is claimed is:

1. A method for forming a cluster, the method comprising:
receiving a plurality of pulses, by a radar receiver;
selecting a first pulse of the plurality of pulses as an anchor point;
receiving a second pulse, by the radar receiver, the second pulse and the anchor point each having a respective feature vector, each feature vector having a plurality of features;
generating at least one weight corresponding to a feature;
calculating, using the weight, a weighted distance between the feature vector of the second pulse and the feature vector of the anchor point;
comparing the weighted distance to a threshold; and
determining that the second pulse is a member of the cluster when the weighted distance is less than the threshold,
wherein the generating at least one weight corresponding to a feature comprises:
generating calibration pulses of known characteristics, by a pulse generator;
injecting the calibration pulses of known characteristics into the radar receiver during operation;
determining the variation in the feature measured; and
calculating the weight as a function of the variation in the feature measured.

2. The method of claim 1, wherein the feature is selected from the group consisting of: pulse width, pulse carrier frequency, elevation angle of arrival, azimuth angle of arrival, and pulse amplitude.

3. The method of claim 1, wherein the generating at least one weight corresponding to a feature is repeated after the elapse of a predetermined length of time.

4. The method of claim 1, wherein the generating at least one weight corresponding to a feature is repeated after a change in an environmental condition exceeding a predetermined amount.

5. The method of claim 1, wherein the weighted distance is the weighted $l_2$ distance.

6. The method of claim 1, wherein the weighted distance is the weighted $l_2$ distance wherein the matrix of weights is the inverse covariance matrix.

7. A method for forming a cluster, the method comprising:
receiving a plurality of pulses, by a radar receiver;
selecting a first pulse of the plurality of pulses as an anchor point;
receiving a second pulse, by the radar receiver, the second pulse and the anchor point each having a respective feature vector, each feature vector having a plurality of features
generating at least two weights corresponding to a feature;
calculating, using the weights, a weighted distance between the feature vector of the second pulse and the feature vector of the anchor point;
comparing the weighted distance to a threshold; and
determining that the second pulse is a member of the cluster when the weighted distance is less than the threshold,
wherein the calculating the weighted distance comprises selecting a weight from the at least two weights based on the corresponding feature in the feature vector of the anchor point.

8. The method of claim 7, wherein the at least two features are selected from the group consisting of: pulse width, pulse carrier frequency, elevation angle of arrival, azimuth angle of arrival, and pulse amplitude.

9. The method of claim 7, wherein the generating at least two weights corresponding to a feature is repeated after the elapse of a predetermined length of time.

10. The method of claim 7, wherein the generating at least two weights corresponding to a feature is repeated after a change in an environmental condition exceeding a predetermined amount.

11. The method of claim 7, wherein the weighted distance is a weighted $l_2$ distance.

12. The method of claim 11, wherein the weighted $l_2$ distance is the Mahalanobis distance.

* * * * *